Oct. 26, 1943.  L. V. GUILD  2,332,850
FLOW METER
Filed Dec. 24, 1942
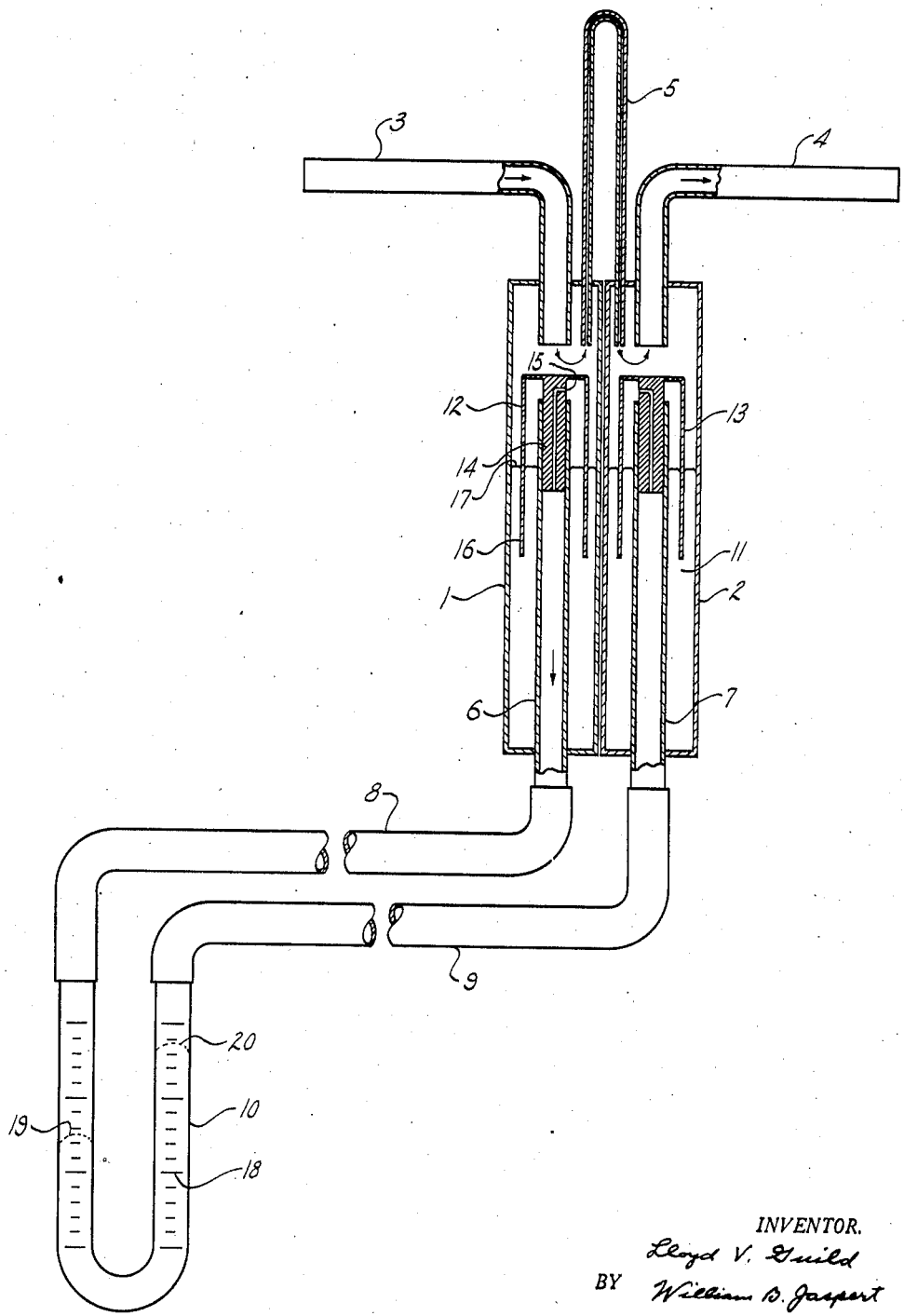
INVENTOR.
Lloyd V. Guild
BY William B. Jaspert
Attorney.

Patented Oct. 26, 1943

2,332,850

UNITED STATES PATENT OFFICE 2,332,850

FLOWMETER

Lloyd V. Guild, Pittsburgh, Pa., assignor to Burrell Technical Supply Company, Pittsburgh, Pa., a corporation of Pennsylvania Application December 24, 1942, Serial No. 469,995

3 Claims. (Cl. 73—205)

This invention relates to improvements in flow meters, and it is among the objects thereof to provide a flow meter construction which eliminates contact between the gases flowing therethrough and the liquid in the flow meter manometer.

In the use of flow meters to indicate the rate of flow of gases in gas samples being measured and the like, the gas in conventional practice contacts with water or other liquid in the manometer, which results in the absorption of appreciable amounts of the gas in the liquid. In gas analysis work it is also possible that such adsorbed gases may be liberated to the gas stream due to temperature change or to the fact that the gas being sampled is of substantially different composition than the gases last passing through the flow meter.

In accordance with the present invention, the flow meter is so constructed that any gases flowing therethrough are isolated from the liquid of the manometer, and the rate of flow is measurable with the same accuracy as in conventional flow meter structures.

The invention will become more apparent from a consideration of the accompanying drawing constituting a part hereof in which like reference characters designate like parts, and in which the single figure is a vertical cross-sectional view partially in elevation of a flow meter with a flow meter manometer attached thereto.

In the drawing the numerals 1 and 2 designate barrels having a gas inlet conduit 3 and an outlet conduit 4, the barrels being connected by a capillary or orifice tube 5 extending into the upper chambers of the barrels 1 and 2.

Inner tubes 6 and 7 extend from the bottom upwardly into the barrels and a substantial distance through the bottom wall of the barrels for connections by flexible conduits 8 and 9, respectively, with a flow meter manometer 10.

The barrels 1 and 2 are filled with mercury 11 or other suitable liquid to a level terminating short of the upper ends of the tubes 6 and 7. Floats 12 and 13 are slidably mounted in the top of the tubes 6 and 7 and have guides in the form of plungers 14 freely slidably in the tubes 6 and 7, the plungers being provided with bleeders 15 so as to offer no resistance to their downward movement. The floats have depending skirt portions 16 which extend below the level 17 of the mercury in tubes 6 and 7 and are of a weight to remain partially submerged in the mercury to seal-off the gases in the upper chambers of the barrels 1 and 2.

The manometer 10 may be connected directly to the tubes 6 and 7 but are preferably connected by the flexible conduits, such as rubber hose 8 and 9, to permit placing the manometer remote from the flow meter for the convenience of the user. The manometer is provided with graduations 18 calibrated to designate the rate of flow in accordance with the desired rate established by the size of the orifice of the capillary tube 5.

The operation of the above described flow meter is briefly as follows.

Gases flowing through the meter enter the inlet tube 3 and pass into the constricted capillary tube 5 from which they pass from the barrel 1 to barrel 2, and thence through the outlet 4 as indicated by the arrows. Since the rate of flow between the inlet and outlet 3 and 4, respectively, is restricted by the capillary tube 5, greater pressure will be exerted on float 12 than on float 13, with the result that the pressure is transmitted to the column of water or other liquid designated by the levels 19 and 20 in the manometer 10, the level 19 designating the rate of gas flow.

It will be seen from the foregoing description of the invention that by means of the floats, the gases passing through the flow meter are isolated from the liquid in the manometer, thereby eliminating possibility of absorption by the liquid.

It is also evident that the float construction provides a sensitive instrument which will accurately register the volume or rate of gas flow through the meter. The device is of simple construction, and there are no operating parts that are subject to wear or that could in any manner produce variations in the use of the device.

Although one embodiment of the invention has been herein illustrated and described, it will be evident to those skilled in the art that various modifications may be made in the details of construction without departing from the principles herein set forth.

I claim:

1. A flow meter for measuring the rate or volume of gas flow comprising a gas receiving and a gas discharge chamber, an inlet connection for the receiving chamber and an outlet connection for the discharge chamber, said chambers communicating through a restricted orifice to establish a pressure differential between said chambers, a tube extending through the bottom of each of said chambers a substantial distance into said chambers, liquid filling the bottoms of said chambers to a distance below the upper ends of said tubes, floats constituting movable closures for said tubes, each having a plunger slidably mounted in one of the tubes and having depending skirt portions submerged below the top of the liquid in one of the chambers to seal off the chamber from the tube, and a pressure responsive flow indicator connected across the bottom ends of the tubes outside of the gas chambers.

2. A flow meter for measuring the rate or volume of gas flow comprising a plurality of barrels, each having a tube extending through the bottom a substantial distance into the barrel and a tube extending through the top short of the ends of the bottom tubes, mercury in said barrels at a level below the top of the bottom tubes, floats having plungers movable in the ends of the said bottom tubes and having body portions floating in the mercury and an orifice connection between the tops of said barrels constituting a restricted flow passage for gases entering one barrel through one top tube and leaving the other barrel through the other top tube, said bottom tubes being connected to a manometer.

3. A flow meter as described in the next preceding claim having bleeder vents extending through the float plungers from within the floats in communication with the manometer.

LLOYD V. GUILD.